Inventors
John A. Zupez
Llewellyn E. Hoyer
By Wallace, Kinzer and Dorn
Attorneys

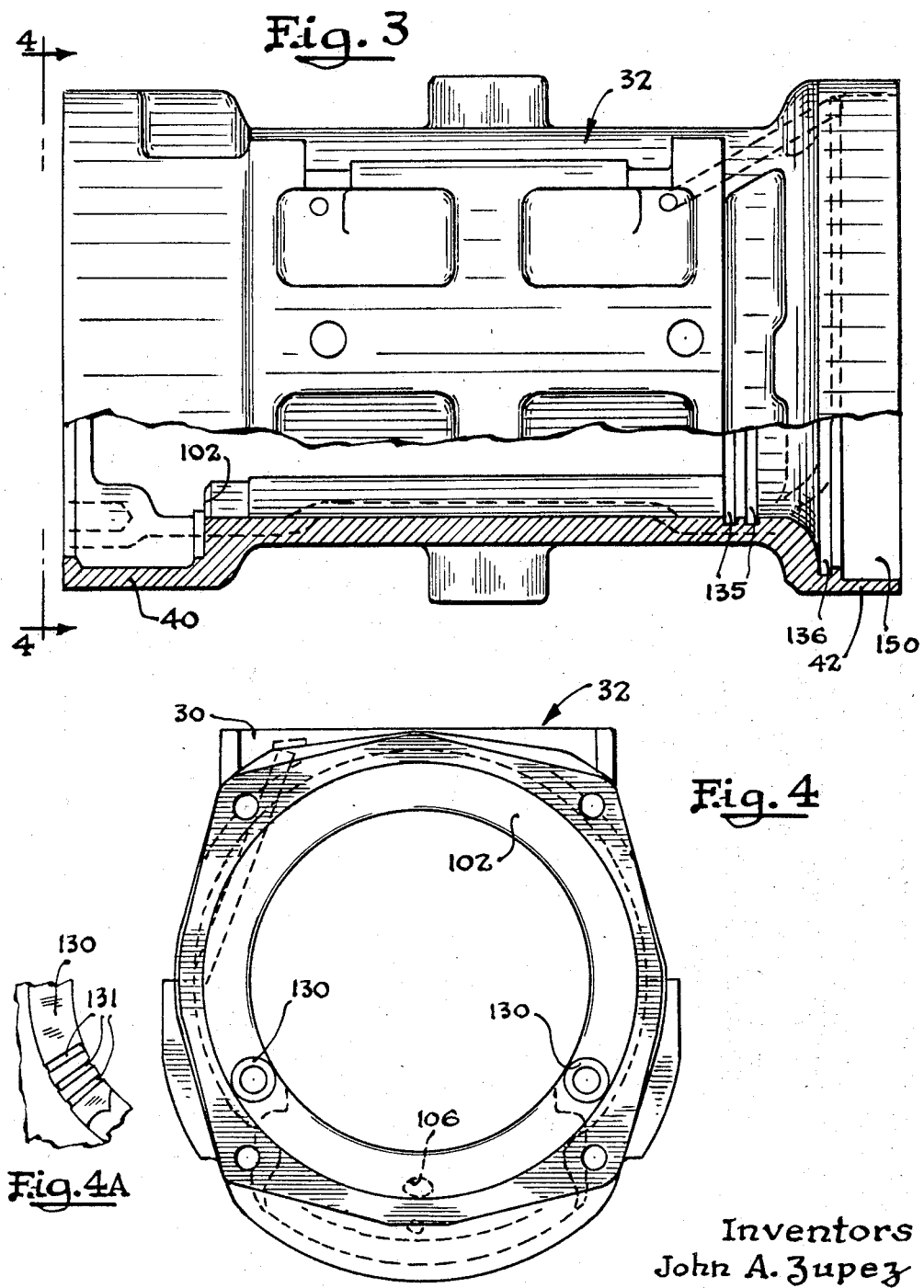

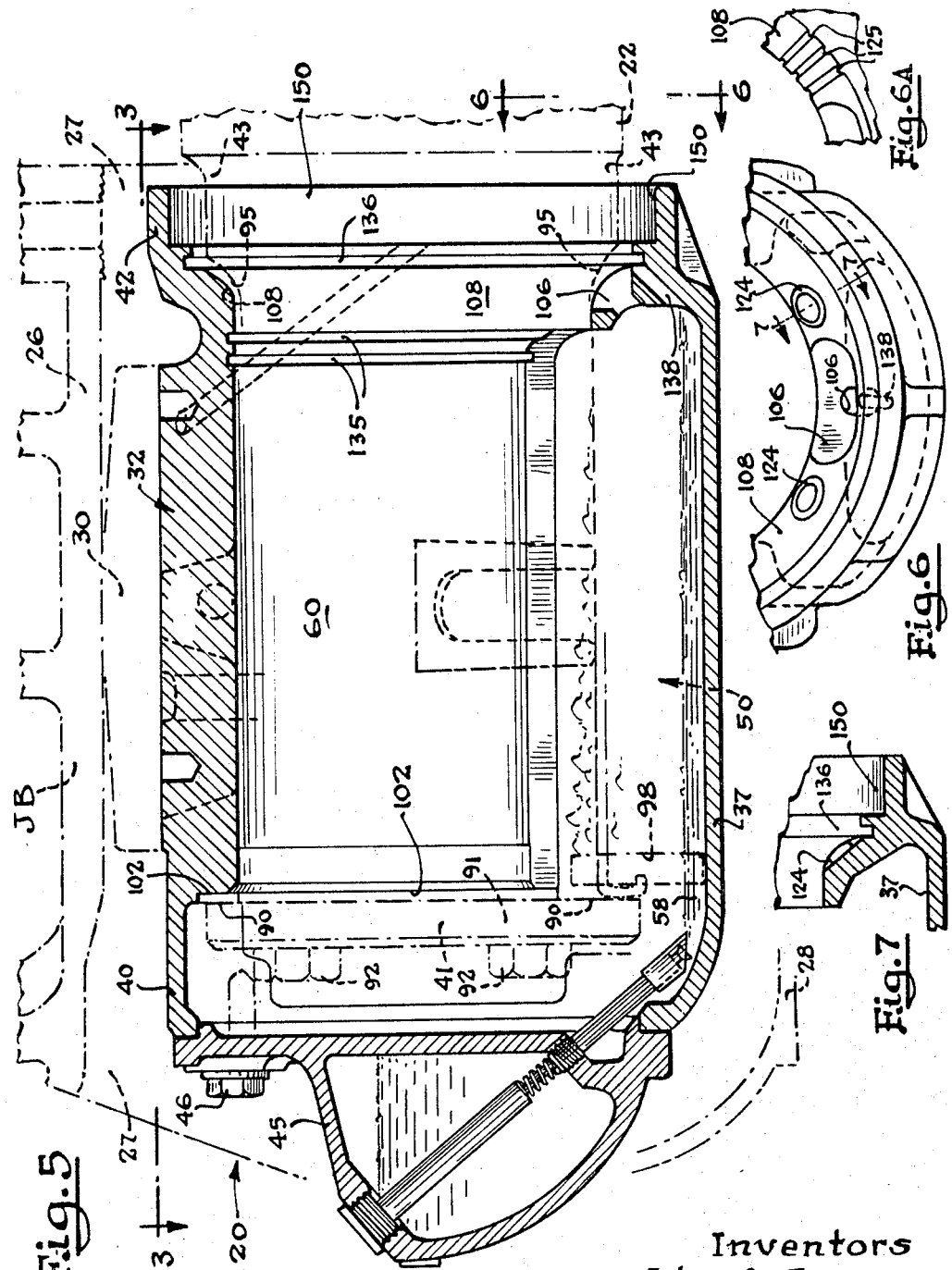

Jan. 21, 1969   J. A. ZUPEZ ET AL   3,423,137
BEARINGS
Original Filed Dec. 26, 1963   Sheet 4 of 5
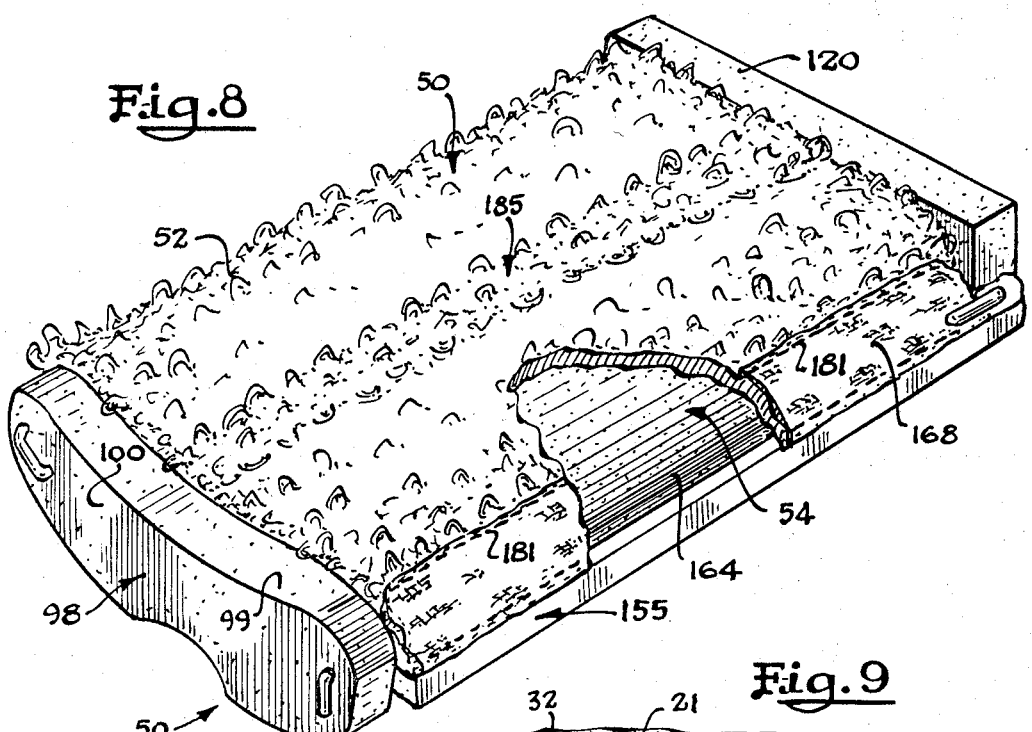
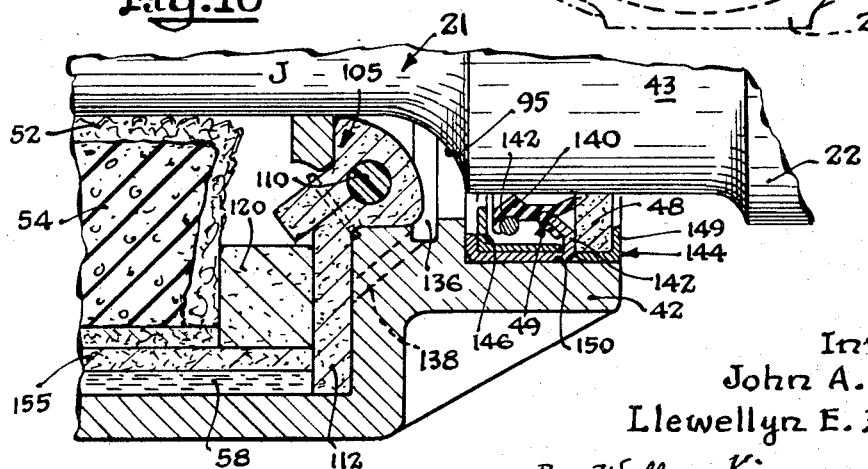
Inventors
John A. Zupez
Llewellyn E. Hoyer
By Wallace, Kinzer and Dorn
Attorneys

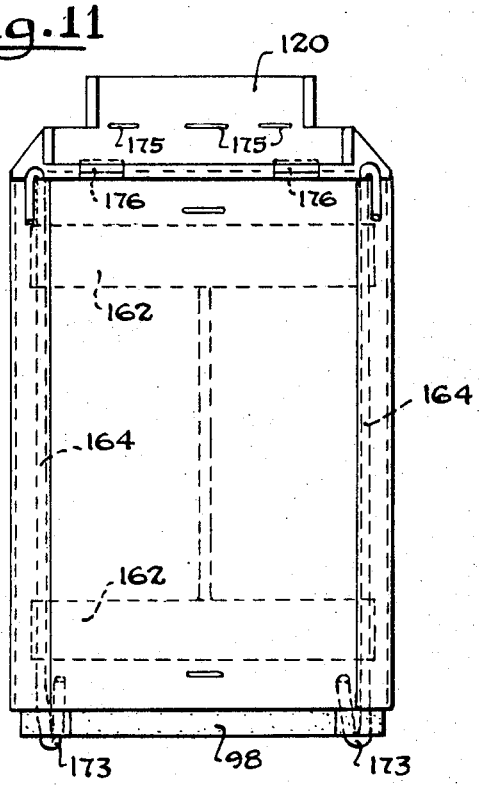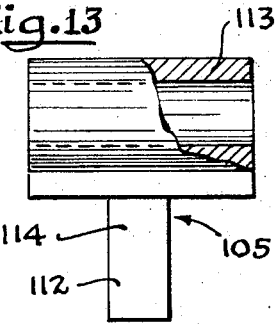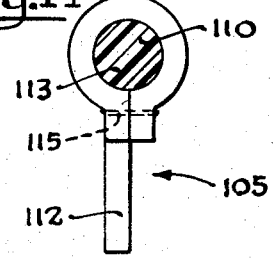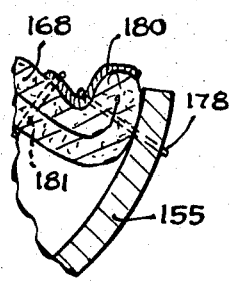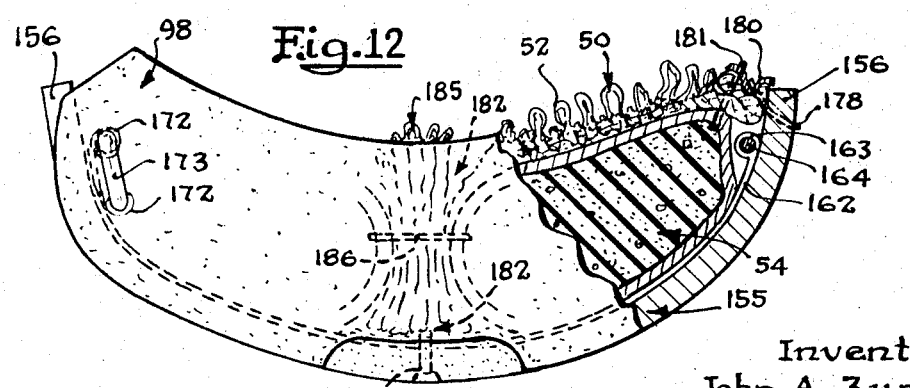

United States Patent Office 3,423,137
Patented Jan. 21, 1969

3,423,137
BEARINGS
John A. Zupez, Ridgewood, and Llewellyn E. Hoyer, Wayne, N.J., assignors to Abex Corporation, a corporation of Delaware
Original application Dec. 26, 1963, Ser. No. 333,315, now Patent No. 3,268,276. Divided and this application June 27, 1966, Ser. No. 560,675
U.S. Cl. 308—87                 3 Claims
Int. Cl. B61f 17/08; F16c 33/10

ABSTRACT OF THE DISCLOSURE

A lubricator for the journal of a railroad car axle includes a separate base pad and separate end pads each of homogeneous oil-absorbent material, preferably felt. One of the end pads is specifically configured to lubricate the collar of the journal. A piece of fabric is joined to the base pad and affords a pocket for an oil-absorbent insert which wicks oil to the fabric for lubricating most of the journal. A leaf spring is united to the lubricator to urge it into good lubricating contact with the journal.

---

This invention relates to lubrication or railroad journals and bearings, and more particularly to lubrication of a cartridge or sleeve-type bearing for a journal of a railroad car.

This application is a division of our application Serial No. 333,315 filed Dec. 26, 1963, now U.S. Patent No. 3,268,276. With the increase in speed of railway cars, it is of particular importance that the journal ends of the car axles be properly lubricated to prevent seizures or hazardous hot-box conditions. The journal is disposed to rotate in a bearing and the journal is lubricated by a lubricating element disposed in contact therewith. The axle is permitted to move in an axial direction relative to the bearing and is limited in the amount of axial movement by opposed radial thrust surfaces or flanges on the bearing, the bearing being held stationary relative to the rotating axle.

An object of the present invention is to achieve improved lubrication of the journal and bearing surfaces on a bearing by applying the lubricant to opposed thrust surfaces of the bearing as well as to the main bearing surfaces, and diverting lubricant against escape from the main bearing area.

Under another aspect, and according to a further object of the invention, the lubrication of the collar thrust surfaces is obtained by a specially fitted lubricating pad on the main lubricating element engaging the collar end of the journal and applying lubricant thereto and lubrication of fillet thrust surfaces is obtained by a separate lubricating pad disposed in a slot in the fillet thrust flange of the bearing.

The invention features and has for a further object a novel lubricator pad for the journal having a base and upstanding ends of a heavy oil wicking material across which is stretched a fabric having chenille threads for conveying lubricant to the journal. The fabric is secured to base to enclose resilient lubricant absorbing elements and to enclose leaf springs disposed against the base to flex the base against the bottom of the support for the lubricator pad.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 3 is a plan view of the 360° bearing taken along the line 3—3 in FIG. 5 in the direction of the arrows;

FIG. 4 is a front end view of the 360° bearing taken along the lines 4—4 in FIG. 3;

FIG. 4A is a fragmentary view showing grooves in a thrust bearing surface;

FIG. 5 is a sectional view showing the 360° bearing mounted on a journal and disposed within a journal bearing;

FIG. 6 is an end view taken along the line 6—6 in the direction of the arrows of FIG. 5 showing the thrust bearing at the fillet end of the journal;

FIG. 6A is a fragmentary view of grooves on the thrust surface at the fillet end of the journal;

FIG. 7 is a sectional view taken along a line 7—7 in the direction of the arrows in FIG. 6;

FIG. 8 is a perspective view of the lubricating pad constructed in accordance with a preferred embodiment of the invention;

FIG. 9 is a section view showing lubricating pads disposed in contact with a journal;

FIG. 10 is an enlarged sectional view showing a fillet lubricating pad disposed in a seat in the thrust bearing of the 360° bearing;

FIG. 11 is a plan view of a felt stiffener pad for the lubricating pad;

FIG. 12 is an enlarged view with a section broken away showing the interior of the lubricating pad;

FIG. 13 is a sectional view of the fillet lubricator;

FIG. 14 is an end view of the fillet lubricator with a resilient pad therein; and FIG. 15 is a fragmentary view showing a stitching of a chenille cover to a felt pad in the lubricating pad.

Figure 1:
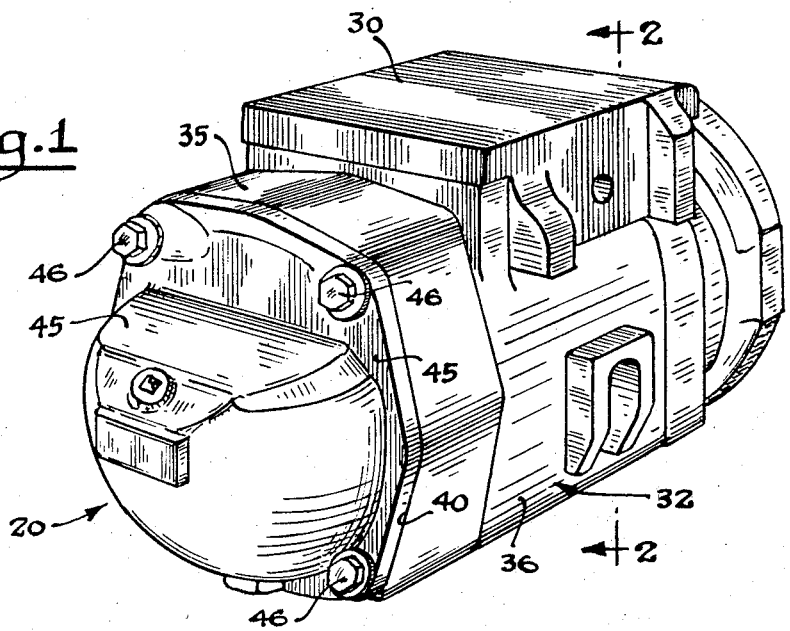
FIG. 1 is a perspective view of a cartridge-type bearing constructed in accordance with the preferred embodiment of the invention.

Referring now to the drawings and more particularly to FIGS. 1 and 5, there is shown a one-piece 360° sleeve type cartridge bearing 20, FIG. 1, which is adapted to be mounted on the end of a journal J, FIG. 12, of railway axle 22 disposed in journal box JB, which is shown in dotted lines in FIG. 5. The journal box JB is of standard construction and dimension and includes a top wall 26 leading to generally parallel side walls 27, FIG. 5, which in turn lead to an internally rounded bottom wall 28. As shown, the dimensions of the journal box JB are such that the cartridge bearing 20 is spaced inwardly of the walls of the journal box JB. At the top of the journal box JB, a conventional wear plate 30 is wedged between the top wall 26 of the journal box, and a bearing casting 32, FIG. 5, of the cartridge bearing 20.

While the bearing is described hereinafter as being disposed within the journal box JB, it will be understood that the cartridge bearing 20 is capable of being mounted on the journal of a pedestal type railway car truck as well. Also, it is to be understood that various aspects of the lubricating system for the journal 21 are capable of being employed with the so-called segment or 180° type of conventional journal bearing, as well as with a 360° bearing casting as will be apparent to those skilled in the art from the description hereinafter.

Figure 2:
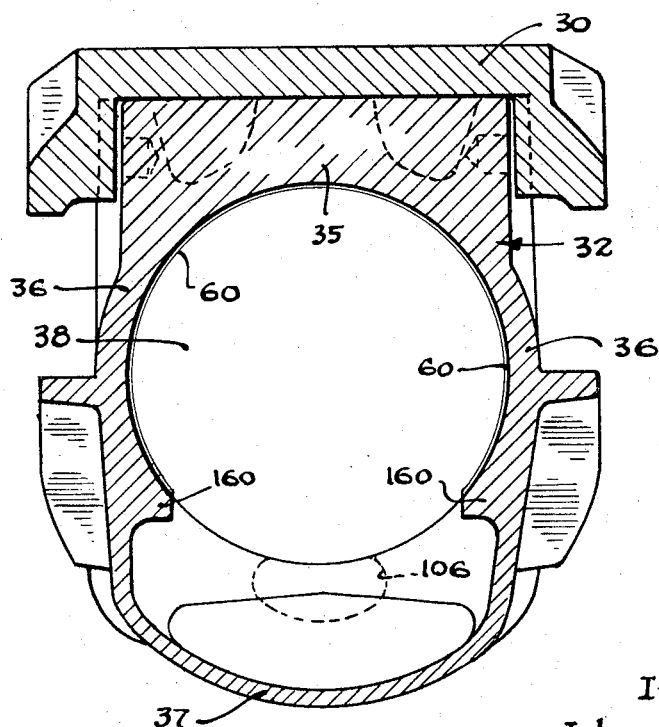
FIG. 2 is a sectional view taken along the lines 2—2 in FIG. 1 in the direction of the arrows showing a section through the bearing cartridge.

The bearing 32 is a cast hollow sleeve having a rounded top wall 35, FIG. 1 and 2, with rounded side walls 36 continuing from the top wall, a rounded bottom wall 37 continuing from the side walls, and a bearing bore 38 enabling the bearing to be readily slipped on to a reduced diameter portion 21 of the journal J of the car axle 22, as will be apparent from FIG. 5.

The bearing bore 38, FIG. 2 is preferably lined centrifugally with a lining of bearing material such as to reduce friction between the journal and bearing material. The bore thus lined has a diameter just slightly larger than the diameter of the reduced portion of the journal J. The bearing 32 is preferably cast from a bronze bearing metal, although other types of metal such as cast aluminum bearing metal, malleable iron, versalloy or the like can be employed.

As best seen in FIG. 5, the bearing 32 extends in an axial direction from an annular collar portion 40 encircling a collar plate 41 secured on the journal J to an annular dust guard portion 42 encircling an enlarged diameter or dust guard portion 43 of the journal J. The cartridge bearing 20 is sealed at the collar end portion 40 by a front cover or face plate 45, FIGS. 1 and 5, which is secured to the bearing casting 32 by threaded bolt type fasteners 46. The bearing is sealed at the opposite or fillet end by a felt dust guard seal 48, FIG. 10, and a rubber oil seal 49, FIG. 10, in sealing engagement with the entire peripheral surface of the enlarged diameter portion 43 of the journal J. Thus, with the cartridge bearing 20 placed in a journal box JB, the journal J and the interior bore 38 of the bearing casting 32, are completely sealed from dirt or other foreign matter which might contaminate the lubricant or the bearing surfaces and the journal rotating therein. Conversely, the lubricant is sealed in the bearing against loss to the atmosphere past the oil seal 49.

The journal J is lubricated by a main lubricator or lubricating pad means 50, FIG. 8, disposed on the bottom wall 37 of the bearing casting 32, with an upper chenilled fabric 52 in engagement with the lower peripheral surface of the journal J as shown in FIG. 5. As will hereinafter be described in greater detail, the lubricator 50 embodies inserts of oil absorbent sponge rubber or the like 54, FIG. 8, which are disposed at their bottom portions in a pool or reservoir 58 of lubricant, FIG. 5. The oil absorbent pads 54 convey lubricant to the chenilled fabric 52 where the oil is applied to the lower peripheral surface of the journal J, by which the oil is conveyed during rotation of the journal J to the Babbitt lining along the main bearing surfaces 60, FIGS. 2 and 5.

The lubricating means 50 is adapted to lubricate the bottom peripheral portion of the journal J. The lubricating means, herein employed, also is uniquely constructed to lubricate an annular thrust surface 90, FIG. 5, on a collar 91 secured by bolt-type fasteners 92 to the end of the journal J, and to lubricate a fillet thrust surface 95, FIGS. 5 and 10, which is a curved surface joining the smaller diameter journal end portion and the enlarged diameter portion 43 of the journal J. As illustrated in FIG. 5, the thrust surface 90 on the collar 91 is adapted to move into engagement with a felt lubricating pad 98, which has an upper arcuate surface 99, FIG. 8, for engaging the bottom peripheral surface of the journal J adjacent the chenille fabric 52 and a radially disposed side wall surface 100 adapted to contact directly the thrust surface 90 on the collar 91.

As best seen in FIGS. 4 and 5, the bearing casting 32 has an annular bearing flange with a thrust surface 102 extending circumferentially about the bearing casting 32 and adapted to engage the thrust surface 90 on the collar 91, when the journal 21 moves rightwardly as viewed in FIG. 5, to bring the thrust surfaces 90 and 102 into engagement with one another. The collar 91 moves during and with the rightward axial movement of the attached journal J, FIG. 5, to engage the collar thrust surface 91 with the thrust surface 102 and thereby limit rightward movement of the journal J relative to bearing casting 32.

The fillet thrust surface 95 is lubricated by a special lubricating pad 105, FIG. 10, which is disposed in a slot or opening 106, FIGS. 5 and 6, in a fillet end thrust bearing surface 108. The opening 106 includes an elongated lubricator receiving seat and a passage leading to the oil reservoir 58. As best seen in FIG. 5, the fillet bearing surface 108 on the sleeve bearing casting 32 is a convex bearing surface adapted to engage the concave thrust surface 95 on the journal 21. The fillet thrust surface 108 limits the leftward movement of the journal 21 relative to bearing casting 32, as seen in FIG. 10.

The fillet thrust lubricator 105 consists of a relatively small piece of felt with the upper portion looped to enclose a small elastometer or resilient interior cylinder or member 110, FIGS. 10 and 14. As best seen in FIG. 13, the lubricator 105 is constructed from a one-piece felt pad 112 of generally T-shaped configuration with an upper head portion 113 looped and secured to a narrow leg portion 114 by stitches 115, FIG. 14. The fillet lubricator 105 has a general shape shown in FIGS. 13 and 14, when constructed, but when forced within the receiving opening 106 in the thrust bearing 108 and engaged by the fillet surface 95 of the journal 21, the fillet lubricating pad 105 assumes the general configuration shown in FIG. 10, with the leg 114 bent downwardly into the oil reservoir 58 to wick oil or the lubricant upwardly to the fillet thrust surfaces 95 and 108. The leg 114 is abutted against a felt end pad 120 disposed at the collar end of the lubricator 50.

To accomplish better lubrication of the thrust surfaces at both the collar and fillet ends of the journal J and journal bearing casting 32, the thrust surfaces 102 and 108, respectively, are each provided with oil retaining grooves 124 and 130, FIGS. 4 and 6. As shown in FIG. 6, a pair of circular grooves 124 are cut or otherwise formed beneath the surface level of the convex surface 108 and as lubricant is distributed about the fillet thrust surfaces 95 and 108 from the fillet lubricating pad 105, the circular grooves 124 become filled with lubricant and function as additional lubricating means for holding and applying lubricant to the thrust surfaces 95 and 108 of the journal 21.

The grooves 124 perform an additional function in that the grooves 124 serve as scrapers to scrape from the journal 95 any Babbitt or bearing metal which might be thereon due to contact with the thrust surface 108. If the Babbitt metal is not collected or scraped from the journal thrust surface 95, the Babbitt metal tends to smear on the fillet lubricator pads 105 and cause a substantial decrease in the lubricating capability of the lubricator 105 because of the film of Babbitt thereon.

While the oil retaining and scraping grooves 124 for the fillet thrust surface 108 are shown as being circular in FIG. 6, it is understood that these grooves could be of other configurations such as the straight line grooves 125 shown in FIG. 6A.

In FIGS. 4 and 4A, the collar end of the 360° bearing casting 32 is shown with a pair of circular oil retaining grooves 130 formed therein for collecting returning lubricant from the collar lubricating pad 98 on the lubricating means 50, and for serving as a scraping edge to remove Babbitt that would otherwise smear across the side wall 100 collar end lubricator 98, thereby limiting its effectivenesses as a lubricating element. The straight line grooves 131 can be employed in lieu of the circular grooves 130 in the collar end thrust surfaces 102 on the bearing casting 32.

In practice, it has been found that the lubricant applied to the journal 21 by the lubricating means 50 proceeds to work itself axially along the journal J and lining 60, and then outwardly across the oil seal 49 and dust seal 48, whereupon the lubricant is lost to the atmosphere. Not only does this condition cause an increased consumption of oil, but also this condition renders a hot-box condition more likely due to the rapid depletion of oil. To lessen the escape of the lubricant in an axial direction past an oil seal such as the oil seal 49, the bearing casting 32 is provided with a pair of spaced annular grooves 135, FIG. 5, in the interior wall of the bearing 32 just before the fillet thrust surface 108. Thus, as the lubricant between the Babbitt lining 60 and the journal 21 works its way axially out of the bearing 32, the lubricant is trapped or diverted by grooves or channels 135 to be directed downwardly to the reservoir of lubricant 58, whereupon the lubricant again can be furnished to the working area of the bearing 32.

An additional oil sealing groove 136, FIG. 5, is provided just immediately adjacent the oil seal 49 and also serves to divert oil tending to escape past the oil seal 49 downwardly to a connecting conduit 138 leading to the reservoir 58. The conduit 138 is in the portion of the thrust bearing 108 immediately below the opening 106 in which the lubricator pad 105 rests.

Lubricant moves across the journal 21 in an axial direction to an oil seal 49, the movement being greatest across the upper circumferential surfaces of the bearing and journal 21. The oil seal 49 has a scraping edge 140, FIG. 10, disposed in contact with the journal 21 about its entire peripheral surface to prevent axial movement of lubricant therepast. The oil seal 49 carried in a wide annular, circumferential surface 150 formed in the dust guard portion 42 of the bearing casting 32. The scraping point 140 is a pointed scraping edge of rubber or the like which is held in tight sealing engagement with the enlarged portion 43 of the journal J by a circular garter spring 142 disposed within a fabricated insert 144 having a pair of spaced and inwardly directed flanges 145 and 146 spaced from the journal 21. The flange 145 has an oblique end portion seated within a forked section in the rubber seal 49 to hold the seal against rightward axial movement. The seal is prevented from axial movement in a leftward direction by the flange 146. Thus, the insert 144 is disposed in the annular groove or shoulder 150, FIG. 5, of the bearing casting 32. The dust seal 48 is an annular ring of felt or other dust sealing material and is carried in annular holder ring 149 having an L-shaped section. When in proper position on the shoulder 150, the dust seal 48 is held between the flange 145 and outer flange portion of the holder ring 149.

Referring now to FIGS. 8 and 11–15 inclusive, the lubricating means 50 and the various components thereof are shown in greater detail. The lubricating means includes a bottom base 155 preferably made of felt and adapted to be seated on the bottom of the bearing casting 32. As seen in FIG. 9, the felt pad 155 is disposed to conform to the bottom 37 of the bearing casting and the longitudinal sides 156 of the base extending upwardly adjacent the bottom of cross-sectional columns 160 on the bearing casting 32. The felt pad 155 is urged to conform against the bottom and lower side walls of the bearing casting 32 by a pair of spring steel clips or leaf springs 162, FIGS. 11 and 12, which attempt to expand the longitudinally extending sides 156 of the felt pad 155 away from each other, and which, in so doing, tend to flatten or straighten the lubricating means 50 including the chenille fabric 52, thereby forcing the fabric 52 into tighter engagement with the bottom of the journal J.

As seen in FIG. 12, the spring steel clips 162 have opposed circular eyes or looped ends 163 which are aligned with similar ends on the other clip 162 and through which is inserted a longitudinally extending wire 164. At the collar end of the lubricating means 50, the ends of the wires 164 have hooks 173 inserted through preformed openings 172 in the collar lubricating end pad 98 for the purpose of securing this felt end pad 98 to the chenille fabric 52 and to the lubricating means 50. That is, the opposite ends of the wires 164 are looped or hooked upwardly over a marginal canvas backing portion 168 on the chenille fabric 52 to secure the end felt pad 98 and wires 164 to the chenille fabric 52 and thereby to the lubricating means 50.

As will be seen in FIG. 8, the base 155 is constructed of a considerably thinner piece of felt than the pieces of felt for end pads 98 and 120. Specifically, the felt base 155 is approximatelly 3/16 of an inch in thickness, whereas the collar felt end pad 98 is approximately 1/2 of an inch in thickness and the fillet end pad 120 is approximately 3/4 of an inch in thickness.

The fillet felt end 120 is a separate piece of 3/4-inch felt and is of generally a T-shaped configuration, FIG. 11, and rests on a complementary shaped portion formed on the end of the bottom felt 155. The fillet end fillet 120 is secured to this end of the felt base 155 by a plurality of spaced staples 175, FIG. 11.

To hold the inserts 54 against longitudinal movement, small end straps 176, FIG. 11, are sewn between the cover 52 and the base 155 at the open ends of longitudinally extending pockets in which the inserts 52 are contained.

As best seen in FIGS. 8 and 15, the chenille cover 52 is attached to the felt base 155 by means of stitches 178. During assembly of the lubricating means 50, a twill or canvas binder strip 168 is sewn first to the chenille fabric 52 by stitches 181 along the two opposite end portions of the chenille cover 52. Then, during the final assembly of the lubricator, the stitches 178 are sewn through both the binder 168 and the chenille fabric 52, as best seen in FIG. 15, to secure the fabric 52 to the base 155. In addition to affording a holding element for the stitches, the binder 180 serves the purpose of keeping the chenille threads away from the bearing at the ends of the lubricating means 50, thereby avoiding what is commonly known in railroad terminology as "waste grabbing."

The chenille fabric 52 is joined at the center thereof to the base 155 by a longitudinally extending row of stitches 183, FIG. 12. The stitches 183 divide the chenille fabric 50 into a pair of axially extending pockets for oil absorbent inserts 54. As seen in FIG. 12, a separate, center panel of chenille 185 is inserted in a central cavity 182 formed by the stitches 183. Th top portion of the center panel 185 extends slightly above the surface of the chenille fabric 52 to provide a medial and additional wicking element for supplying oil to the journal 21. The center panel 185 is secured in the cavity 182 of the chenille fabric 52 by a row of transversely extending stitches 186.

From the foregoing, it will be seen that the present invention discloses a novel manner of lubrication of a journal and, to this end, employs specially fitted thrust lubricating means. More specifically, there is provided special collar and fillet lubricating elements for lubricating the thrust surfaces of the collar and fillet ends of the journal and the matching thrust surfaces on the bearing.

At the fillet end of the journal, a separate lubricating pad is disposed in a slot in the thrust surface of the bearing to lubricate the thrust surfaces of the journal and bearing at the fillet end of the journal. Hence, while preferred embodiments of the invention have been described and illustrated, it is to be understood that they are capable of variation and modification.

We claim:

1. A lubricator for the journal of a railroad car, said journal having a collar at its outer end, and comprising a one-piece lower base pad of homogenous oil-absorbing material; upstanding one-piece end pads each of separate homogeneous oil-absorbing material secured at the ends of said base pad and adapted to extend adjacent the periphery of the journal, one of said end pads being related to the collar of the journal and being formed with an arcuate upper surface and further presenting a flat forward side wall engageable by the collar to apply lubricant thereto, an oil wicking woven fabric having chenille threads of oil wicking material woven therein to afford a uniform coverage of oil wicking loops across the upper face of the upper fabric member, said fabric member being joined to said base pad and extending between said end pads to form a pocket between said fabric and said base pad, oil-absorbent material disposed in said pocket, a pair of leaf springs flexing said base pad to assume the general configuratoin of the supporting means for the lubricator when the lubricator is disposed in position for lubricating said journal, and wire elements joining the leaf springs to one another and joining at least one of the end pads to the fabric.

2. A lubricator according to claim 1 wherein the base pad and end pads are of felt.

3. A lubricator according to claim 2 including longitudinally extending strips of fabric covering longitudinal end portions of the wicking fabric and securing the fabric to the base pad.

References Cited

UNITED STATES PATENTS

| | | | |
|---|---|---|---|
| 2,904,375 | 9/1959 | Hackedorn | 308—243 |
| 1,900,429 | 3/1933 | Cunning | 308—88 |
| 2,994,569 | 8/1961 | Housman | 308—87 |
| 3,036,870 | 5/1962 | Abel | 308—88 |
| 3,101,223 | 8/1963 | Robinson | 308—87 |
| 3,135,563 | 6/1964 | Hennessy | 308—88 |

MARTIN P. SCHWADRON, *Primary Examiner.*

U.S. Cl. X.R.

308—243